Feb. 12, 1946.  H. BLOUNT  2,394,658
APPARATUS FOR VULCANIZING ARTICLES
Filed Sept. 20, 1944  2 Sheets-Sheet 1
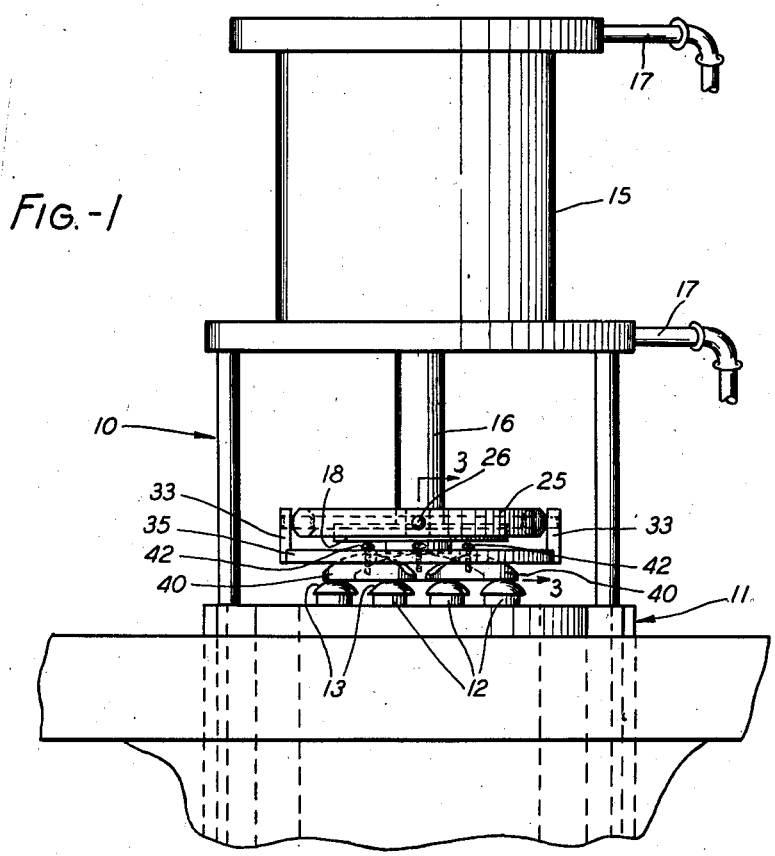
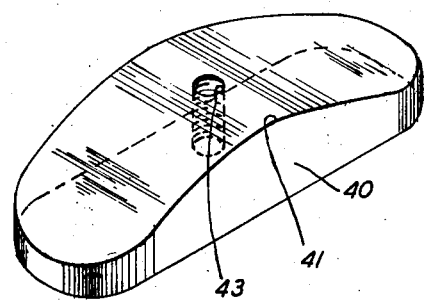
INVENTOR.
H. BLOUNT
BY
ATTORNEY Feb. 12, 1946.   H. BLOUNT   2,394,658
APPARATUS FOR VULCANIZING ARTICLES
Filed Sept. 20, 1944   2 Sheets-Sheet 2
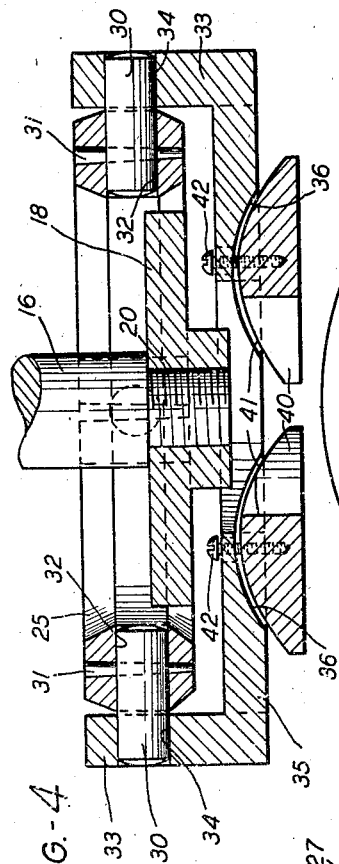
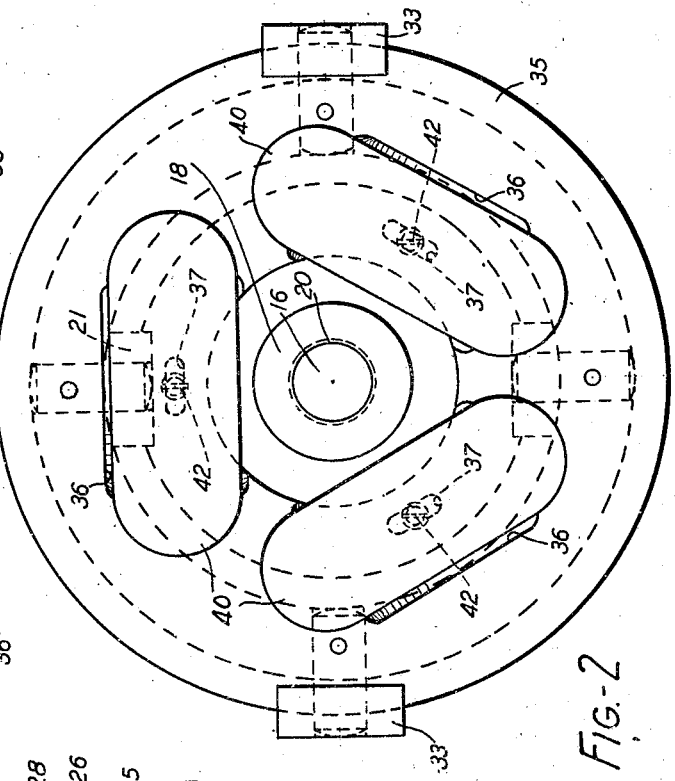
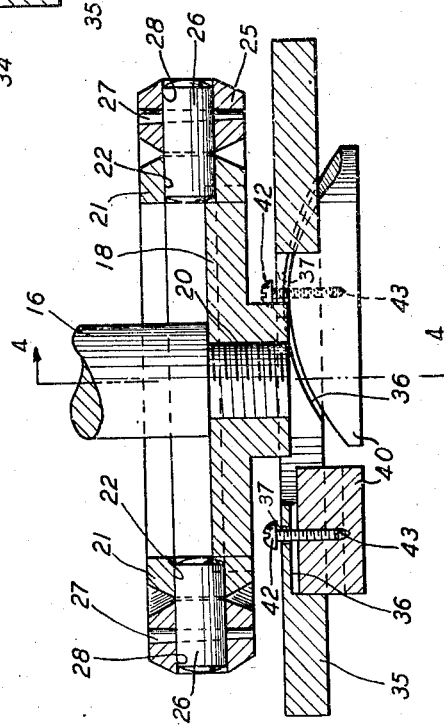
INVENTOR.
H. BLOUNT
BY
ATTORNEY Patented Feb. 12, 1946

2,394,658

UNITED STATES PATENT OFFICE 2,394,658

APPARATUS FOR VULCANIZING ARTICLES

Harry Blount, Baltimore, Md., assignor to Western Electric Company, Incorporated, New York, N. Y., a corporation of New York Application September 20, 1944, Serial No. 554,907

2 Claims. (Cl. 18—16)

This invention relates to apparatus for vulcanizing articles, and more particularly relates to apparatus for vulcanizing a plurality of articles at the same time.

In the vulcanization of a plurality of identical articles, it is desirable for all of the articles to be subjected to the same pressure. In vulcanizing presses heretofore known of the type which has a single ram for pressing simultaneously a plurality of identical articles, it has been very difficult to subject to the same pressure each of a plurality of articles being vulcanized at the same time. Consequently, it is difficult to produce uniformly vulcanized articles thereby.

An object of the invention is to provide new and improved apparatus for vulcanizing articles.

One press embodying the invention comprises molding means, a ram, means for actuating the ram to move it toward the molding means, means for contacting the molding means at spaced points thereon, and means for mounting the contacting means universally on the ram.

A complete understanding of the invention may be obtained from the following detailed description of a specific embodiment thereof, when read in conjunction with the accompanying drawings in which:

Fig. 1. is a fragmentary front elevational view of an apparatus embodying the invention;

Fig. 2 is an enlarged bottom plan view of a portion of the apparatus;

Fig. 3 is an enlarged, vertical, sectional view of the apparatus taken along line 3—3 of Fig. 3, Fig. 4 is an enlarged, vertical sectional view of the apparatus taken along line 4—4 of Fig. 3, and Fig. 5 is an enlarged, perspective view of an element forming a portion of the apparatus.

Referring more particularly to the drawings, there is shown therein a vulcanizing press 10 (Fig. 1) of the same general type of vulcanizing presses as that disclosed in application Serial No. 515,750, filed in the Patent Office on December 27, 1943. The press 10 includes an annular block 11 which serves to retain an annular molding insert (not shown) from which a plurality of plungers 12—12 project. The plungers 12—12 having rounded tops 13—13 formed thereon are positioned in engagement with a plurality of articles (not shown) to be vulcanized and are positioned in a ring-like fashion with equal spaces therebetween. The plungers 12—12 serve to exert pressure upon the articles when the plungers are pressed downwardly, as viewed in Fig. 1.

A cylinder 15 (Fig. 1) of a conventional design encloses a piston (not shown) to which is secured a ram 16. A pair of pipes 17—17 are connected to a valve (not shown), and, when the valve is properly actuated, serve to supply air under pressure to or exhaust air from the ends of the cylinder 15 to raise or lower the piston and the ram connected thereto, depending, of course, upon the manner in which the valve is actuated.

A disc 18 (Figs. 3 and 4) is threaded on a threaded end 20 of the ram 16. The disc 18 has a pair of lugs 21—21 projecting upwardly therefrom, which lugs 21—21 have bores 22—22 formed therethrough and are positioned on the disc 18 at diametrically opposed points on the periphery thereof. An annular ring 25 is pivotally secured to the disc 18 by a pair of pins 26—26, which are secured by keys 27—27 in aligned bores 28—28 formed therein and project into the bores 22—22. Thus, the ring 25 is connected securely but pivotally to the disc 18.

A pair of pins 30—30 (Fig. 4) are secured by keys 31—31 in aligned bores 32—32 formed in the ring 25. The bores 32—32 are positioned at diametrically opposed points on the ring 25 and a line extending therebetween is at a right angle with respect to a line extending between the bores 28—28. An annular plate 35 has a pair of lugs 33—33 projecting therefrom at diametrically opposed points on the edges thereof. The lugs 33—33 have bores 34—34 formed therethrough into which bores the ends of the pins 30—30 project to mount the annular plate pivotally on the ring 25. Since the ring 25 may be pivoted with respect to the disc 18 and the annular plate 35 may be pivoted with respect to the ring 25 along an axis at right angles to the pivotal axis between the ring 25 and the disc 18, the plate 35 may be moved to any angle with respect to the disc 18, except as limited by striking the disc. 18. The possible extent of movement of the plate 35 with respect to the disc 18 depends upon the distance between the plate and the disc and may be increased by the use of lugs longer than the lugs 33—33 in place thereof.

The annular plate 35 has formed therein three concave rocker-like recesses 36—36 and also is provided with three elongated slots 37—37 formed therethrough. The slots extend along the axes of the recesses. Three elongated shoes 40—40 (Fig. 2) having convex surfaces 41—41, which are complementary to the concave recesses 36—36, are secured loosely in the recesses 36—36 by bolts 42—42 (Fig. 4). The bolts pass loosely through the elongated slots 37—37 and are threaded into tapped bores 43—43 formed in the shoes 40—40. Since the bolts 42—42 are mounted loosely in the elongated slots 37—37, the shoes 40—40 may be slid with respect to the slots and may be pivoted about axes perpendicular to the longitudinal axes thereof.

In the operation of the apparatus described hereinabove, the plungers 12—12 are positioned in engagement with an equal number of articles to be molded and are placed in the positions shown in Fig. 1 of the drawings in a manner identical with that described in the application mentioned hereinabove. The positions of the plungers 12—12 are such that each pair thereof is directly below one of the shoes 40—40.

The valve (not shown) then is actuated to cause the ram 16 to be forced downwardly, as viewed in Fig. 1, to force the shoes 40—40 into engagement with the rounded tops 13—13 of the plungers 12—12 to force the plungers against the articles to be molded. Since the plate 35 may be pivoted to any desired plane, the pressure exerted by each of the shoes 40—40 upon the particular pair of the plungers 12—12 with which it is in engagement will be equal. Also, since each of the shoes 40—40 is free to rock in the particular recess 36 in which it is secured, the pressure upon each of the pair of plungers 12—12 engaged by one of the shoes will be equal. Steam or other vulcanizing mediums then may be supplied to heat the annular block and the articles are vulcanized in a manner similar to that described in the application mentioned hereinabove.

Since the pressure upon each of the plungers 12—12 is equal, the pressure exerted upon each of the articles being molded is uniform and thus the articles being vulcanized will be vulcanized equally.

What is claimed is:

1. In a vulcanizing press, an annular molding means for enclosing a plurality of articles spaced in ring-like fashion therein, a plurality of plungers projecting from the molding means in alignment with a plurality of articles enclosed by the molding means for applying pressure to the articles, each of said plungers having a convex end formed thereon, a ram, a plate having concave grooves formed thereon and also being provided with elongated slots extending therethrough along the concave grooves, a plurality of elongated shoes having convex surfaces complementary to the concave grooves, a plurality of bolts extending loosely through the elongated slots for securing the shoes in said grooves in floating relationship therewith, means for mounting said plate universally on said ram, and means for actuating said ram to move each of the shoes into engagement with the convex ends of a pair of the plungers, whereby each of the plungers applies the same force to the article with which it is engaged.

2. In a vulcanizing press, an annular molding means for enclosing a plurality of articles spaced in ring-like fashion therein, a plurality of plungers projecting from the molding means in alignment with a plurality of articles enclosed by the molding means for applying pressure to the articles, each of said plungers having a convex end formed thereon, a ram, a plate having concave grooves formed thereon and also being provided with elongated slots extending therethrough along the concave grooves, a plurality of elongated shoes having convex surfaces complementary to the concave grooves, a plurality of bolts extending loosely through the elongated slots for securing the shoes in said grooves in floating relationship therewith, an annular ring, means for securing the plate to the ring for pivotal movement about a given axis, means for securing the ring to the ram for pivotal movement with respect to the ram about an axis perpendicular to said given axis, and means for actuating said ram to move each of the shoes into engagement with the convex ends of a pair of the plungers, whereby each of the plungers applies the same force to the article with which it is engaged.

HARRY BLOUNT.